United States Patent [19]
Finger et al.

[11] 3,838,247
[45] Sept. 24, 1974

[54] WELDING HELMET

[75] Inventors: John F. Finger; William C. Jackson; Merle E. Pochop, all of Beresford, S. Dak.

[73] Assignee: Sioux Steam Cleaner Corporation, Beresford, S. Dak.

[22] Filed: Mar. 25, 1974

[21] Appl. No.: 454,218

[52] U.S. Cl.................................... 219/146, 2/8
[51] Int. Cl............................................. B23k 37/00
[58] Field of Search............................ 219/147; 2/8

[56] References Cited
UNITED STATES PATENTS
| | | | |
|---|---|---|---|
| 2,904,669 | 9/1959 | Toebe | 219/147 |
| 3,096,430 | 7/1963 | Farr | 219/147 |
| 3,719,793 | 3/1973 | Finger | 219/147 |

Primary Examiner—J. V. Truhe
Attorney, Agent, or Firm—Merchant, Gould, Smith & Edell

[57] ABSTRACT

A light reducing viewing shield, or dark glass, mounted in the hood of a welding helmet for movements toward and away from an operative position in register with a viewing opening in the hood. Mechanism in the hood is operative to move the shield between its operative and inoperative positions responsive to movement of a welding electrode respectively into and out of welding engagement with a workpiece. Control circuitry including a time-delay mechanism insures against the movement of the shield away from its operative position until the welding arc is extinguished; and further insures that the welding arc is extinguished by shutting off the welding current when the hood of the helmet is pivotally moved, relative to the head-engaging harness, away from a position in front of the operator's eyes.

11 Claims, 9 Drawing Figures

3,838,247
PATENTED SEP 24 1974
SHEET 1 OF 3
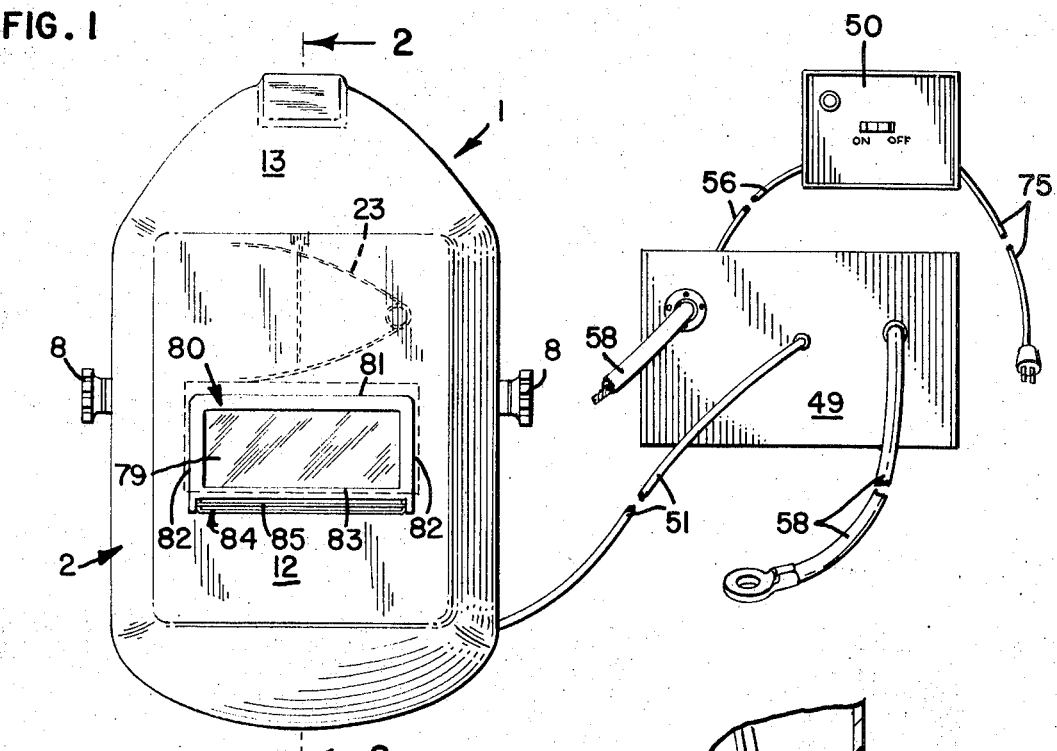
FIG. 1
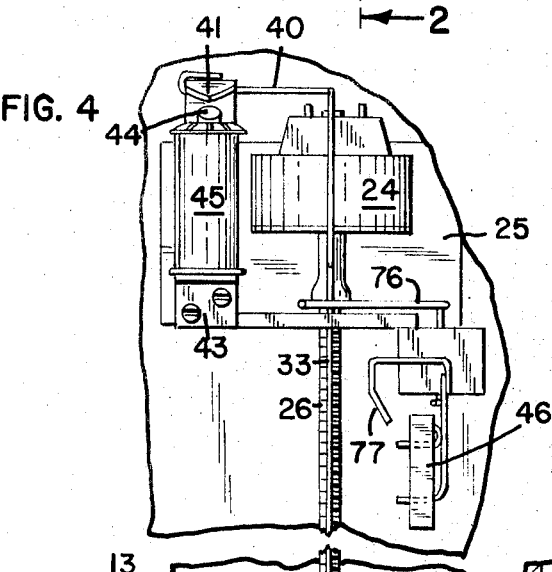
FIG. 4
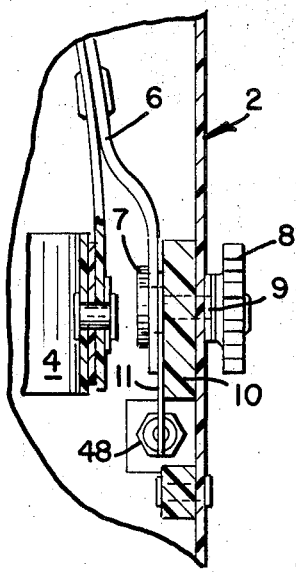
FIG. 3
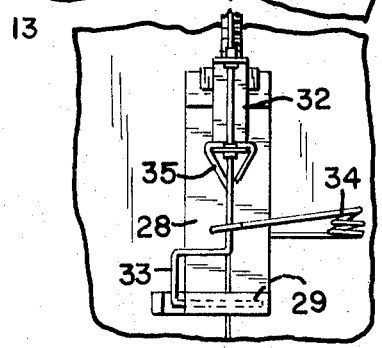
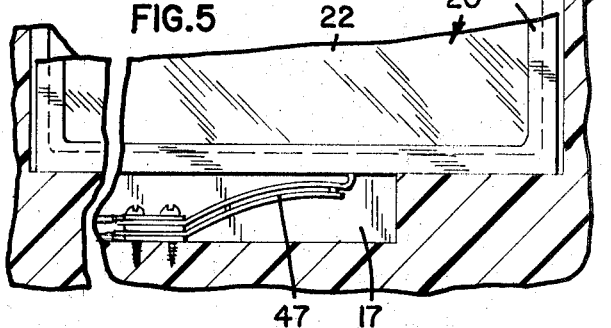
FIG. 5

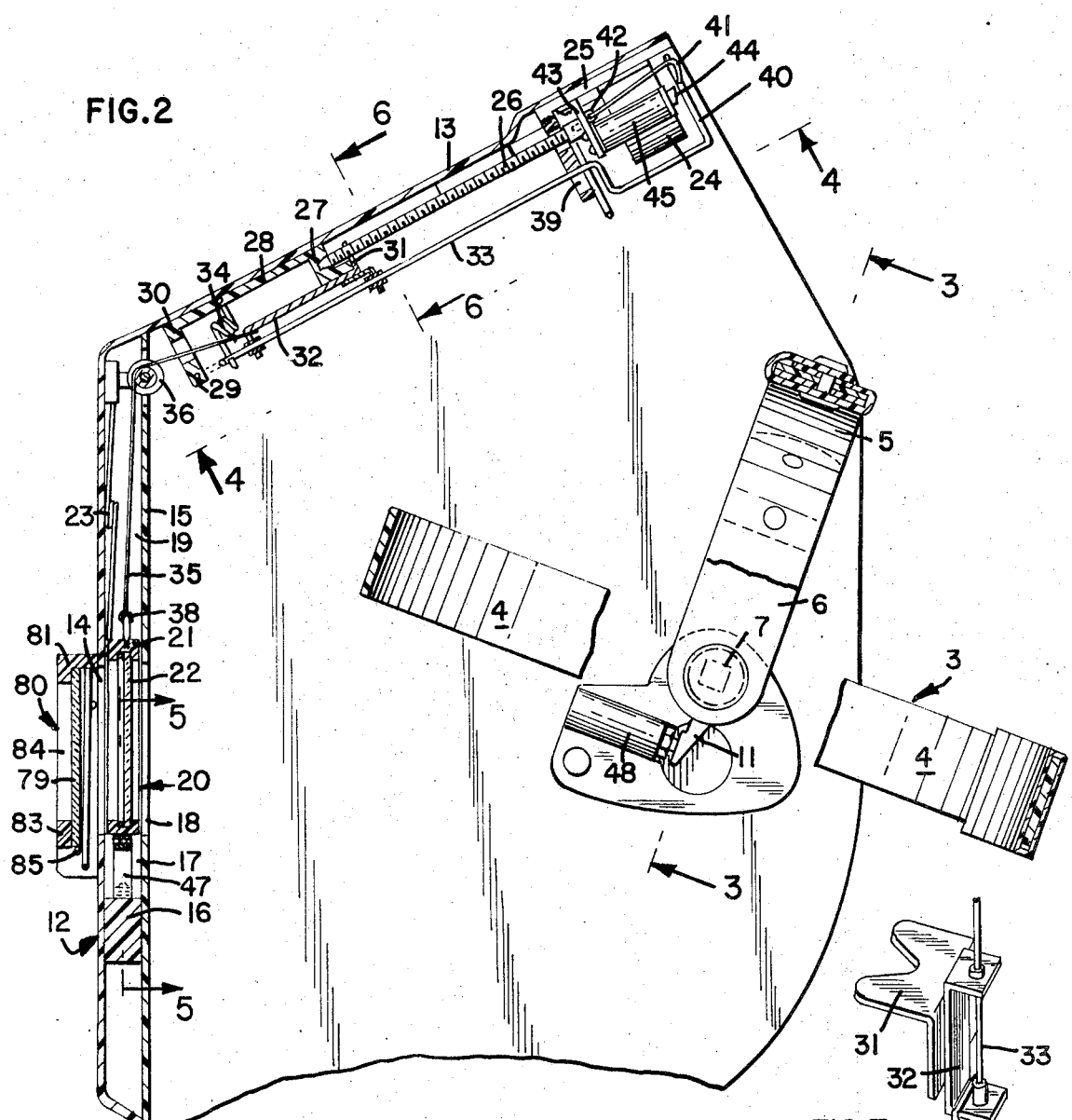
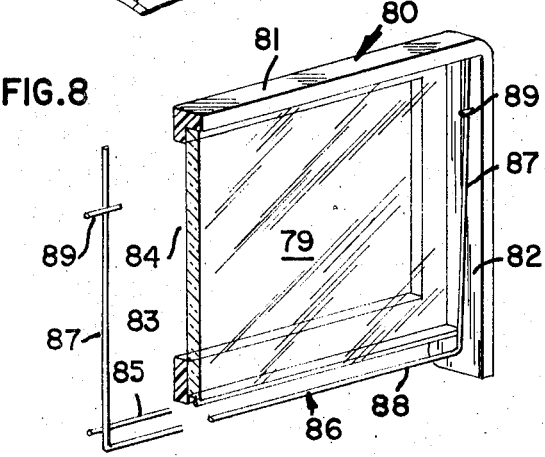
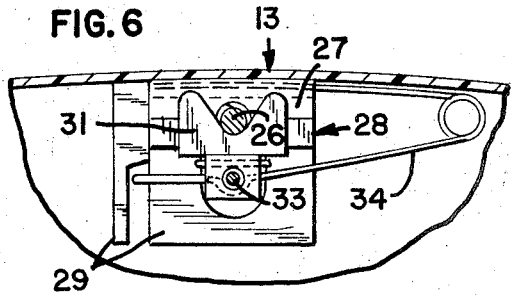

3,838,247

WELDING HELMET

BACKGROUND OF THE INVENTION

This invention is in the nature of an improvement over welding helmets of the type disclosed in U.S. Pat. No. 3,719,793, issued to John F. Finger. Welding helmets have been produced heretofore, having mechanism for automatically moving a dark glass or viewing shield between operative and inoperative positions responsive to moving a welding electrode into and out of engagement with a workpiece. These have employed the use of solenoids more or less directly operatively associated with the viewing shield. Some of these require relatively long solenoid coils and armatures therefor, others using coils of less axial length and motion changing linkage between the viewing shield and solenoid armature. Most of these also utilize releasable latches for holding the viewing shields in one position or the other.

SUMMARY OF THE INVENTION

The welding helmet of this invention involves the usual harness for mounting on the head of the wearer and its cooperating hood pivotally mounted on the harness for movements between an operative position in front of the wearer's face and an inoperative position in overlying relationship to the wearer's head. The hood is provided with a sight opening for viewing the work, and a dark glass or viewing shield is movable between an operative position covering the sight opening and an inoperative position out of register with the opening. A spring urges the viewing shield toward its operative position. A motor having an elongated shaft is mounted in the hood, the shaft defining a screw thread. A half-nut is slidably carried by a support rod for movements generally parallel to the motor shaft, the support rod being moved generally toward and away from the motor shaft so that the half-nut is moved into and out of engagement with the screw thread on the motor shaft. The half-nut is operatively connected to the viewing shield, and the motor shaft rotates in a direction to move the half-nut and viewing shield away from register with the opening in the hood. A control system includes a solenoid for disengaging the half-nut, switches controlling the motor, and control relays, one of which is a time delay relay, for automatically releasing the viewing shield for movements to its operative position when a welding electrode is touched to a workpiece and before a welding arc is created. A switch operated by the viewing shield causes closing of a welding circuit only when the shield is in register with the sight opening. The time delay relay operates to permit momentary breaking of the welding circuit by the electrode without causing the viewing shield to be moved away from the opening when the electrode is moved between closely spaced workpiece portions to be welded. The hood carries a window frame exterior of the opening, the frame having a top, opposite ends, and an open bottom through which a clear transparent pane may be inserted into the frame. A support element is disposed at the open bottom and a resilient spring releasably holds the pane on the support element for quick and easy replacement of the pane in the event that the same becomes damaged or broken.

DESCRIPTION OF THE DRAWINGS

FIG. 1 is a view in front elevation of the welding helmet of this invention, showing connections to control boxes, some parts being broken away;

FIG. 2 is an enlarged fragmentary section taken substantially on the line 2—2 of FIG. 1;

FIG. 3 is a fragmentary detail in section, taken generally on the line 3—3 of FIG. 2;

FIG. 4 is an enlarged fragmentary view in bottom plan, as seen from the line 4—4 of FIG. 2;

FIG. 5 is an enlarged fragmentary section taken on the line 5—5 of FIG. 2;

FIG. 6 is an enlarged fragmentary section taken on the line 6—6 of FIG. 2;

FIG. 7 is an enlarged fragmentary view in perspective of the half-nut and support means therefor of this invention;

FIG. 8 is a fragmentary view in perspective of a window frame and pane supporting means of this invention.

DETAILED DESCRIPTION OF THE PREFERRED EMBODIMENT

Figure 9:
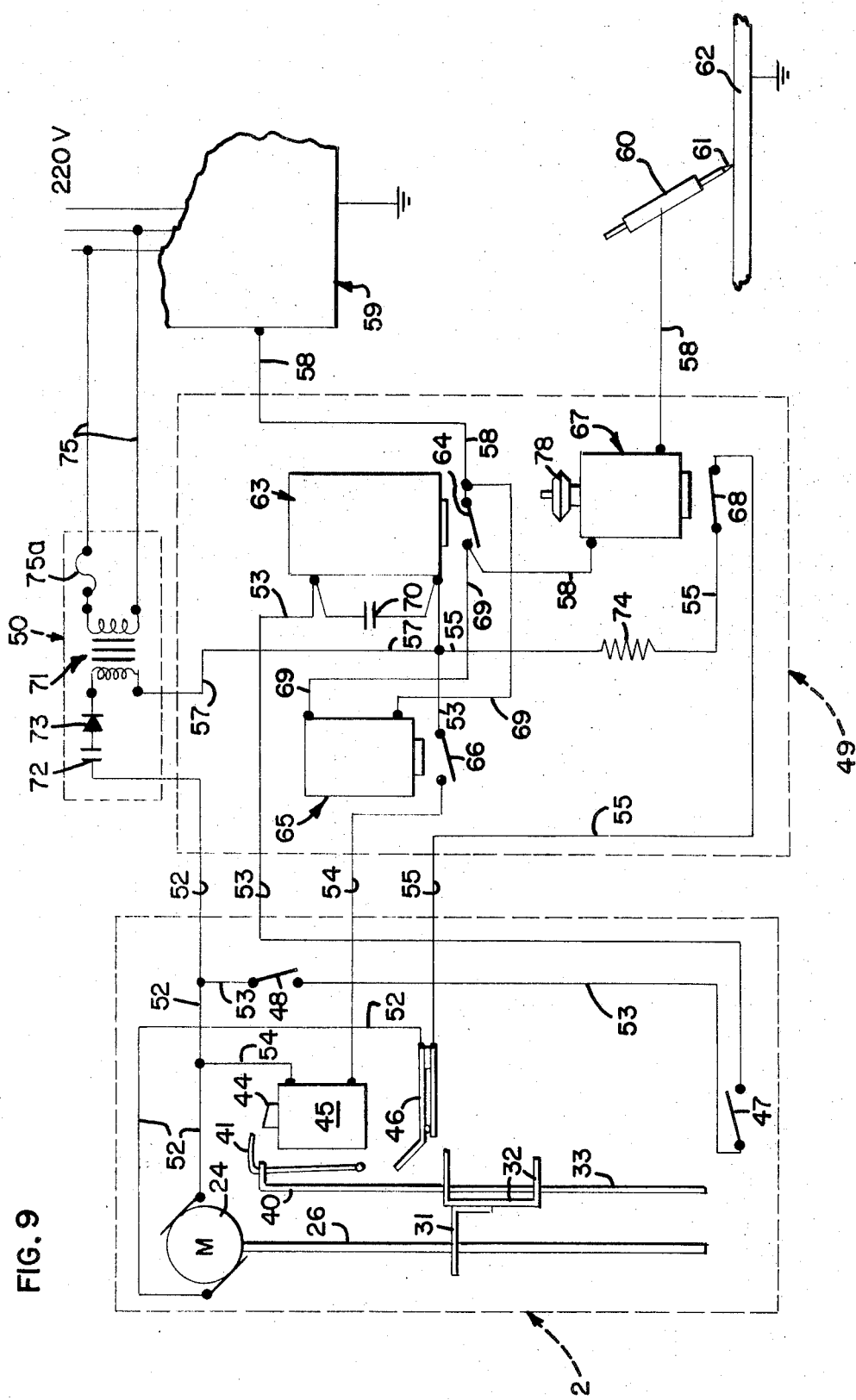
FIG. 9 is a wiring diagram.

In the drawings, a welding helmet is indicated generally by the reference numeral 1, the same comprising a hood 2 of generally conventional shape, and a supporting harness 3. The harness 3 comprises the usual headband 4 which normally encircles the head of a wearer, and a connecting portion 5 which may be assumed to be of inverted generally U-shape and to rest upon the top of the wearer's head to limit downward movement of the harness on the wearer's head. Although only one is shown, a pair of pivot brackets 6 are attached to opposite end portions of the connecting portion or member 5, these being connected to adjacent side walls of the hood 2 by means of pivot bolts 7 and clamping nuts 8, these being provided with coil compression springs 9 that frictionally engage the adjacent surfaces of the hood 2 to impart sufficient resistance to pivotal movement of the hood relative to the harness 3 to hold the hood 2 against accidental pivotal movement thereof. As shown in FIGS. 2 and 3, the pivot bolts 7 extend through mounting blocks 10 rigidly secured to the side walls of the hood 2. For the purpose of the present example, the pivot screws 7 rotate with respect to the hood 2 and mounting blocks 10, one of the pivot bolts 7 being provided with a switch actuator arm 11, the purpose of which will hereinafter become apparent. The headband 4 and connecting portion or member 5 are adjustable to fit the head of a wearer, these being conventional in construction.

The side walls of the hood 2 are connected by a front wall 12 which, in the normal operating position of the hood 2, is vertically disposed in front of the wearer's face, and a top wall 13 that slopes upwardly and rearwardly from the front wall 12, when the front wall 12 is in its vertical position. The front wall 12 is formed to provide a generally rectangular sight opening 14 therethrough. A vertical partition 15 is secured within the interior of the hood 2 in rearwardly spaced parallel relationship to the front wall 12, the upper edge of the partition 15 terminating in downwardly spaced relation to the top wall 13, see FIG. 2. A cross member 16 is disposed between the wall 12 and partition 15 in downwardly spaced relation to the opening 14, and is formed to provide an upwardly opening recess 17, see FIGS. 2 and 5.

The partition 15 is formed to provide an opening 18 that is aligned with the opening 14 in front wall 12, and of substantially the same size. The front wall 12, partition 15 and cross member 16 cooperate to define a compartment or well 19 in which is slidably mounted a viewing shield 20 which comprises a rectangular frame 21 and a dark-colored transparent pane 22 that is of a size to completely cover the sight opening 14 in the front wall 12. The pane 22 is of the type which is usually found in welding helmets to protect the operator's eyes from the extreme light eminating from a welding arc, but which enables the wearer to observe the welding operation. THe viewing shield 20 is movable between its operative position in register with the openings 14 and 18 and an inoperative position between the opening 14 and the top wall 13 of the hood 2 completely out of register with the opening 14. A torsion spring 23, mounted in the well 19, yieldingly urges the viewing shield 20 toward its operative position in register with the opening 14, see FIGS. 1 and 2.

For the purpose of raising the viewing shield 20 away from registration with the opening 14 and against bias of the torsion spring 23, an electric motor 24 is mounted on a bracket 25 secured within the top wall 13 of the hood 2. The motor 24 has an elongated shaft 26 that extends generally parallel to the top wall 13, and is provided for the greater part of its length with screw threads. The free end of the shaft 26 is journalled in a bearing 27 mounted on one end of a bracket 28 rigidly secured to the top wall 13. The bracket 28 has an angular end portion 29 defining an opening 30.

The screw threads on the motor shaft 26 provide a drive portion thereof, the threads having screw threaded engagement with a driven element in the nature of a half-nut 31 that is mounted on an elongated carriage 32. The carriage 32 is slidably mounted on a shiftable guide member in the nature of an elongated guide rod 33 that is disposed in laterally spaced generally parallel relationship to the motor shaft 26 and is pivotally secured at one end to the end portion 29 of the bracket 28, see particularly FIGS. 2 and 4, for swinging movements of the guide rod 33 in directions to move the half-nut 31 into and out of threaded engagement with the motor shaft 26. A torsion spring 34 yieldingly urges the guide rod 33 in a direction to move the half-nut 31 into screw threaded engagement with the motor shaft 26. A length of flexible cable or cord 35 has one end tied to the carriage 32, and is entrained over a pulley 36 journalled in a bracket that is secured to the front wall 12 of the hood 2. The opposite or lower end of the cord 35 is secured to the frame 21 of the viewing shield 20, as indicated at 38 in FIG. 2.

The motor shaft 26 is driven in a single direction, to move the viewing shield 20 out of register with the opening 14. For the purpose of moving the half-nut 31 out of threaded engagement with the motor 26, the guide rod 33 extends through a slot 39 in the motor mounting bracket 25, the rod 33 having an upper end portion 40 that engages an armature 41 pivotally secured, as indicated at 42, to a mounting bracket 43 secured to the motor mounting bracket 25. The armature 41 has its outer end portion disposed to be attracted by the core 44 of a solenoid 45 mounted on the bracket 43, see particularly FIGS. 2 and 4. The armature 41 is so disposed that, when the solenoid 45 is energized, the armature will move in a direction to impart movement to the guide rod 33 and half-nut 31 away from engagement of the half-nut 31 with the screw threads on the motor shaft 26. When the half-nut 31 is moved out of threaded engagement with the shaft 26, the torsion spring 23 moves the viewing shield 20, carriage 32 and half-nut 31 to their positions shown in FIG. 2, wherein the viewing shield 20 is fully in register with the sight opening 14.

Means for controlling operation of the motor 24 and solenoid 45 comprises circuitry includng a normally closed limit switch 46 suitably mounted on the interior of the hood 2, a normally open switch 47 mounted on the cross member 16 within the recess 17 thereof and hereinafter designated as a main relay control switch, a normally open safety switch 48, and other control elements contained in housings 49 and 50 remote from the helmet 1. The main relay control switch 47 is closed by engagement with the frame 21 of the viewing shield 20 when moved to its operative position by the spring 23. The circuitry further includes a cable 51 containing leads 52, 53, 54 and 55. A cable 56 extends from the box or housing 49 to the housing 50 and contains a portion of lead 52 and a lead 57. With reference to FIGS. 1 and 9, it will be seen that a heavy welding lead 58 extends from a conventional welding apparatus 59 to the housing 49, and from thence to a conventional holder 60 of a welding electrode 61. In FIG. 9, a workpiece is indicated at 62.

A main relay 63 including a normally open switch 64, a high voltage relay 65 including a normally open switch 66, and a time delay relay 67 including a normally closed switch 68 are all contained within the housing 49, th coil of the time delay relay 67 comprising windings of the welding lead or cable 58. The normally open relay switch 64 is interposed in the cable 58. The high voltage relay 65 is connected to opposite sides of the switch 64 by a pair of leads 69. The coil of the main relay 63 is interposed in the lead 53 in series with the switches 47 and 48, one end of the lead 53 being connected to the lead 52 within the hood 2. The opposite end of the lead 53 is connected to one side of the switch 66. It will be noted that a condenser 70 is shunted across the coil of the main relay 63. The solenoid 45 is interposed in the lead 54, one end of the lead 54 being connected to the lead 52 within the hood 2, the opposite end of the lead 54 being connected to the switch 66 opposite the adjacent end of the lead 53.

The motor 24 is interposed in the lead 52, one end of the lead 52 being connected to one side of the limit switch 46, the lead 52 extending within the housing 50 to the secondary coil of a transformer 71, a condenser 72 and a rectifier 73 being interposed in the lead 52 within the housing 50. The lead 57 is connected at one end to the secondary coil of the transformer 71 and extends within the housing 49, bieng connected at its opposite end to the lead 53 between the main relay 36 and the switch 66. The lead 55 extends from the limit switch 46 opposite the adjacent end of the lead 52, and is connected at its opposite end to the lead 53 at its juncture with the lead 57. The switch 68 of the time delay relay 67, and a resistor 74 are interposed in series in the lead 55. The primary winding of the transformer 71 is connected to a source of higher voltage electricity by means of a pair of leads 75, one of which is fused, as indicated at 75a.

The limit switch 46 is provided with a pair of actuator element 76 and 77, the former of which is engaged by the guide rod 33 when the solenoid 45 is energized, to open the switch 46. The actuator element 77 is disposed in the path of travel of the half-nut 31 and its carriage 32, and operates to open the switch 46 upon engagement with the half-nut 31. The motor 24, being connected in series with the switch 46, opening of the switch 46 either by engagement of the actuator 77 with the half-nut 31 or carriage 31, or by energization of the solenoid 45 will cause the motor 24 to be de-energized. The motor 24 will be held in a de-energized state as long as the solenoid 45 is energized.

Operation of the above-described control apparatus is as follows:

Assuming that the welding apparatus 59 and leads 75 are connected to a source of electrical potential, and that the welding apparatus and workpiece 62 are grounded by the usual grounding line and clamp, not shown, and that the electrode 61 is out of contact with the workpiece 62, the helmet 1 is placed upon the operator's head, and the hood 2 pivotally moved so that the opening 14 is disposed in front of the operator's eyes. With the hood 2 thus positioned, the switch actuator arm 11 engages and closes the safety switch 48 to energize the main relay 63, closing the switch 64. The switch 68 of the time delay relay 67 being closed, as is the limit switch 46, the motor 24 is energized through leads 52, 55 and 57 to cause the viewing shield 20 to be raised out of registration with the opening 14, enabling the operator to have unrestricted vision through the aligned openings 14 and 18. It will here be noted, that the solenoid 45 is in a de-energized state, enabling the torsion spring 34 to move the half-nut 31 into engagement with the motor shaft 26 to cause raising of the viewing shield 20. When the shield 20 is raised to its inoperative position, the half-nut 31 and carriage 32 will engage the switch actuator 77 to open the limit switch 46, de-energizing the motor 24, the half-nut 31 remaining in engagement with the threaded shaft 26. It will be further noted that, as soon as the viewing shield 20 begins its movement toward its inoperative position, the switch 47 is allowed to open, de-energizing the main relay 63 to open its switch 64.

As soon as the operator touches the electrode 61 to the workpiece 62, the time delay relay 67 is energized, opening the switch 68 to maintain the motor 24 de-energized. The main relay 63 also being de-energized, a circuit is closed through the high voltage relay 65 through the lead 58, leads 69, electrode 61 and workpiece 62, energizing the relay 65 to close its switch 66 and energize the solenoid 45. Energization of the solenoid 45, causes the armature 41 to be moved in the direction to release the half-nut 31 from engagement with the threads on the motor shaft 26, permitting the torsion spring 23 to rapidly move the viewing shield 20 into registration with the opening 14. The viewing shield 20 closes the switch 47, causing the main relay 63 to be energized again closing the switch 64 and permitting a heavy welding voltage to be conducted to the workpiece 62 through the welding electrode 61. As long as the welding arc is maintained, the relays 63, 65 and 67 will be maintained energized, as will the solenoid 45, to hold the half-nut 31 out of engagement with the motor shaft 26, and maintain the motor 24 in a de-energized condition.

In the event that the operator lifts the electrode 61 sufficiently from the workpiece 62 to break the arc, the time delay relay 67 becomes de-energized to permit the switch 68 to close to de-energize the relay 65 and solenoid 45, causing the motor 24 to be energized and permitting the half-nut 31 to be moved into engagement with the threads on the motor shaft 26. The time delay relay 67 is of conventional construction, preferably using a dash-pot, indicated diagrammatically at 78. The dash-pot 78 permits the switch 68 to open instantaneously upon energization of the relay 67, but permits a time-lag of very short duration between de-energization of the relay 67 and closing of the switch 68. Thus, if the operator raises the electrode 61 from the workpiece 62 sufficient to break the arc, and restarts the arc at a different place within the time interval permitted by the dash-pot 78, the switch 68 will remain open, and the motor 24 will remain de-energized, as will the relay 65 and solenoid 45. Thus, the operator can achieve welds at spaced portions of the work without the control mechanism operating to raise and lower the viewing shield. Should the operator wish to view the work, it is only necessary to raise the electrode 61 out of operative engagement with the workpiece 62 and hold the same away from the work for the few seconds that it takes for the switch 68 to close, whereupon the viewing shield will be withdrawn from the opening 14 and the operator may view the work without raising the hood 2.

If, during the welding operation, the operator unthinkingly pivotally raises the hood, the switch actuator 11 will move away from the switch 48, causing the same to open to de-energize the main relay 63, opening the switch 64 and breaking the welding current. This operation takes place instantaneously so that the arc between the electrode 61 and workpiece 62 is extinguished before the light from the same strikes the operator's eyes.

For protecting the viewing pane 22 when the same is in its operative position, and for protecting the worker's eyes when the viewing shield 20 is raised, a clear transparent window pane 79 is provided. The pane 79 may be made from clear transparent glass or plastic material, and is removably mounted in a rectangular frame 80 having a top portion 81, opposite ends 82, a front wall 83 defining a rectangular opening 84, and an open bottom. The opening 84 is aligned with the openings 14 and 18. A support element in the nature of a rigid rod or wire 85 extends across the open bottom of the frame 80 immediately rearwardly of the front wall 82 thereof for supporting the window pane 79 within the frame 80. The frame 80 may be adhered to the front wall 12 of the hood 2, or may be integrally formed therewith as desired. Means for removably holding the window pane 79 in the frame 80 comprises a generally U-shaped retainer member 86 preferably formed from resilient wire or similar material, the same being formed to provide a pair of vertically disposed arms 87 having upper ends embedded in the top wall 81. adjacent the end walls 82 of the frame 80. The lower ends of the arms 87 are connected by a horizontal portion 88 that is disposed in downwardly spaced relation to the support rod 85. A pair of axially aligned pins 89 project laterally inwardly each from a different one of the frame end walls 82, behind a respective one of the retainer member arms 87, and are so located as to cause the arms 87 to be yieldingly urged forwardly into engagement with the rear surface of the window pane 79, to yieldingly hold the pane 79 in engagement with the front wall 83 of the frame 80. The support rod 85 is forwardly spaced from the front wall 12 of the hood 2 a distance sufficiently greater than the thickness of the window pane 79 to permit the window pane 79 to be moved into or out of the frame 80 through the open bottom thereof when the retainer member 86 is bent rearwardly into engagement with the front wall 12. With this arrangement, should a window pane 79 be broken or otherwise damaged, it is a simple matter to remove the same from the window frame 80 and insert a new pane in lieu thereof.

While we have shown and described a commercial embodiment of our improved welding helmet, it will be understood that the same is capable of modification, and that modification may be made without departure from the spirit and scope of the invention, as defined in the claims.

What is claimed is:

1. A welding helmet, adapted to be connected in an electric welding circuit including a source of electric power, a workpiece connected to the source by a common line, and an electrode, comprising:
    a. a harness adapted to fit the head of a wearer;
    b. a hood rotatably mounted on the harness for movements between an operative position in front of the wearer's face and a raised position above the wearer's head, said hood defining an opening for viewing the workpiece;
    c. a light reducing eye protecting viewing shield in said hood;
    d. means mounting said shield for movements between an operative position covering said opening and an inoperative retracted position out of register with said opening;
    e. yielding means urging said shield in a direction of said movement toward said operative position;
    f. drive means for moving said shield in the opposite direction toward its retracted position against bias of said yielding means and including, a motor having a rotary shaft, a drive portion on said shaft, a cooperating driven element, mounting means mounting said driven element for movements toward and away from driving engagement with said drive portion and for movements in opposite directions angularly with respect to said first mentioned movements, and a connector element between said driven element and said shield;
    f. and control means for said drive means including, mechanism for moving said driven element away from engagement with said drive portion, and said electrode, for causing said shield to be moved to said operative position by said spring responsive to engagement of a workpiece by said electrode, and for causing said motor to move the shield out of register with said opening responsive to operative disengagement of the electrode from the workpiece.

2. The welding helmet defined in claim 1 in which said drive portion comprises a screw thread on said shaft, said driven element comprising a half-nut, said mounting means including a shiftable guide member supporting said half-nut for movements longitudinally of said motor shaft.

3. The welding helmet defined in claim 2 in which said shiftable guide member is pivotally mounted at one end in said hood for swinging movements toward and away from said motor shaft to move the half-nut into and out of threaded engagement with said screw thread.

4. The welding helmet defined in claim 3, characterized by yielding means urging said guide member in a direction of swinging movement thereof to move said half-nut into engagement with the screw thread, said guide member having a portion providing an armature, said mechanism for moving the driven member away from engagement with the drive portion including said armature and a cooperating solenoid disposed, when energized, to move said half-nut from the drive portion.

5. The welding helmet defined in claim 2 in which said control means includes electrical circuitry involving a limit switch for de-energizing said motor responsive to predetermined movement of said shield toward said retracted position thereof.

6. The welding helmet defined in claim 1 in which said mechanism for moving the driven element away from the drive portion includes a solenoid; said control means further including electrical circuitry comprising said solenoid; a time delay relay, the coil of which includes a portion of a power lead, connected to the electrode; a main relay including a switch interposed in said power lead; and a solenoid control relay operative to cause energization of said solenoid to move the driven element out of engagement with said drive portion of the motor shaft.

7. The welding helmet defined in claim 6 in which said control means includes a main relay control switch engaged by said shield in its operative position and operated by said shield to energize said main relay to close a welding circuit to a workpiece.

8. The welding helmet defined in claim 7 in further combination with a safety switch mounted for operation by movement of said hood relative to the harness and connected in series with said relay controlled switch, said safety switch being operative responsive to movement of the hood toward its raised position to de-energize said main relay, whereby to shut off welding current to the electrode.

9. The welding helmet defined in claim 6 in which said time delay relay includes a switch in series connection with said motor and operative only after a predetermined time interval subsequent to removal of a welding electrode from a workpiece to cause energization of said motor to retract the shield from said opening.

10. The welding helmet defined in claim 1 in which said shield comprises a viewing pane and a mounting frame therefor; said hood opening being generally rectangular in outline and being defined by a frame having a top, opposite ends, an open bottom portion, and a support element at one side of said open bottom portion, and in further combination with a clear transparent window pane inserted into said frame through said open bottom portion and resting on said support element, and retainer means yieldably holding said window pane on said support element within said frame.

11. The welding helmet defined in claim 10 in which said retainer means comprises a pair of resilient arms having upper ends secured in the top of said frame and each disposed to engage a surface of the window pane adjacent a different one of the frame ends, said resilient arms having lower ends connected by a cross portion adjacent the bottom of the frame and positioned to be of easy access for moving the arms in a window pane releasing direction.

* * * * *